No. 871,358. PATENTED NOV. 19, 1907.
B. H. PECK.
LAND ROLLER AND PACKER.
APPLICATION FILED FEB. 27, 1906.
2 SHEETS—SHEET 1.
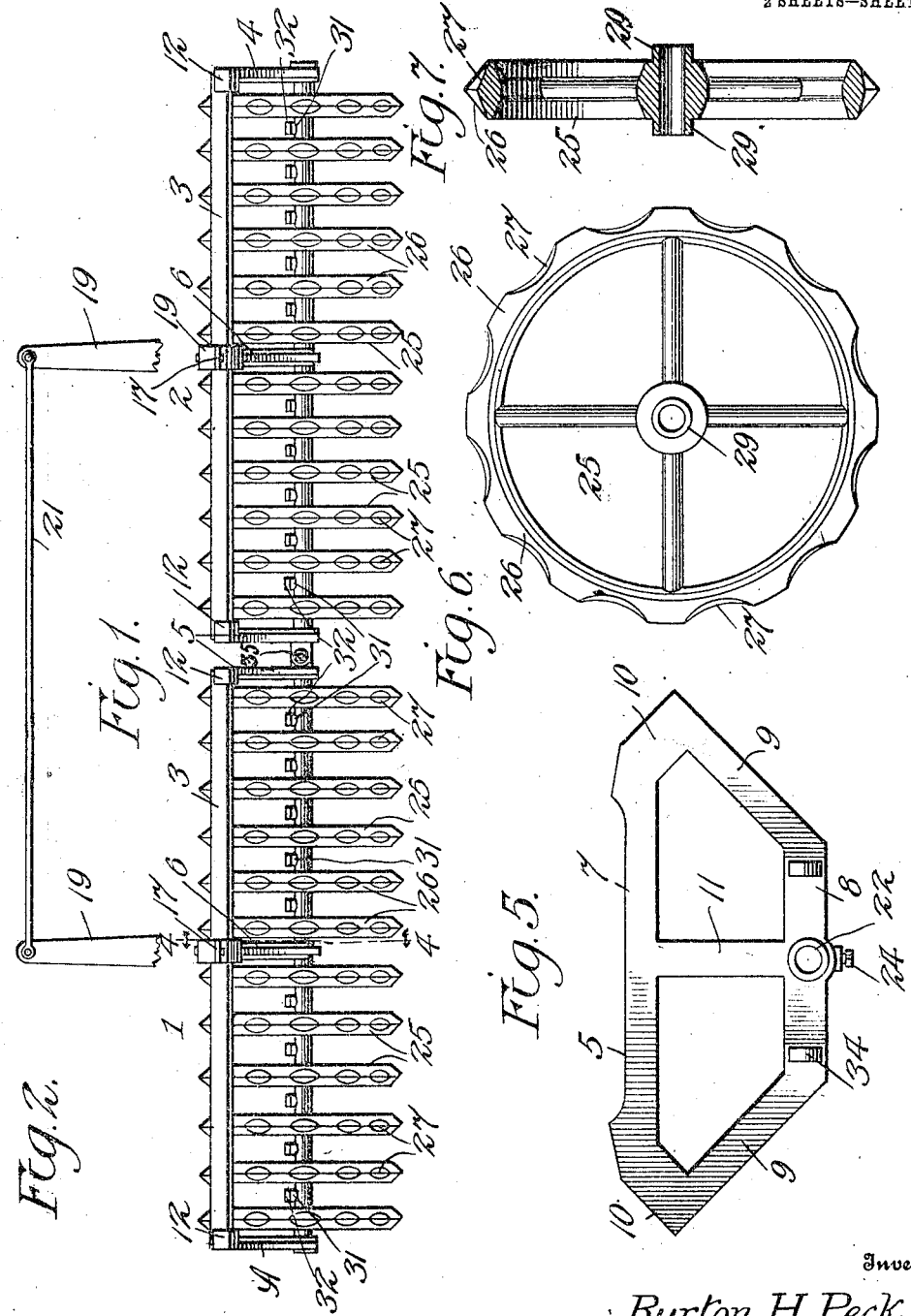
Witnesses
Inventor
Burton H. Peck
By
Victor J. Evans
Attorney

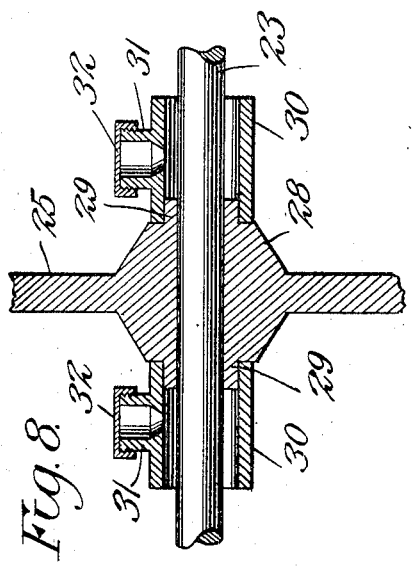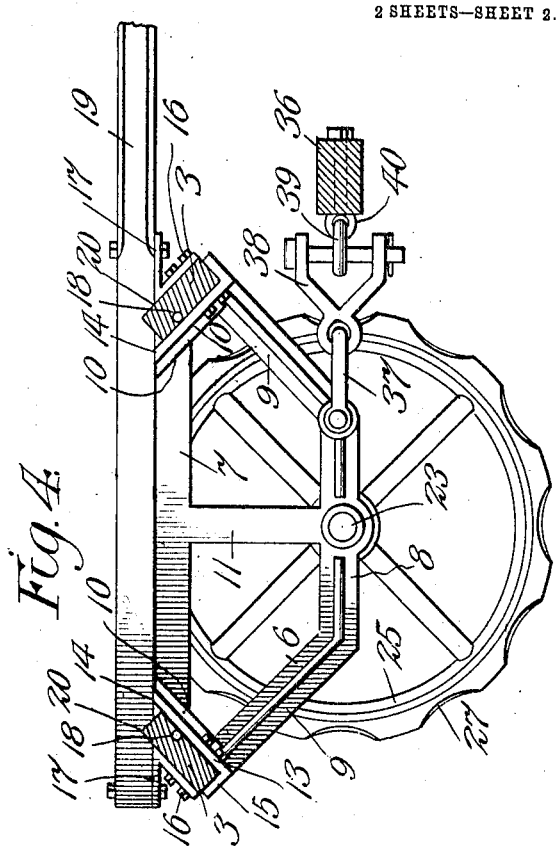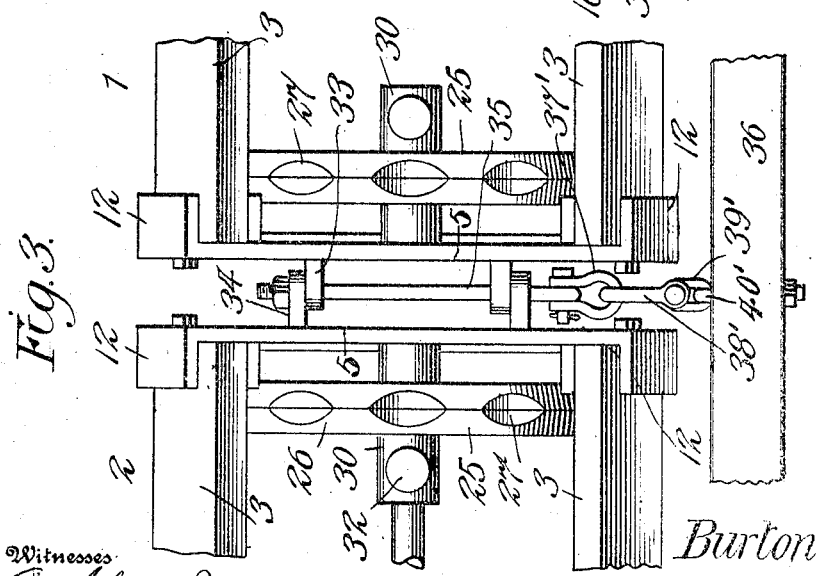

UNITED STATES PATENT OFFICE.

BURTON H. PECK, OF NEAR LEXINGTON, OREGON.

LAND ROLLER AND PACKER.

No. 871,358.  Specification of Letters Patent.  Patented Nov. 19, 1907.

Application filed February 27, 1906. Serial No. 303,271.

*To all whom it may concern:*

Be it known that I, BURTON H. PECK, a citizen of the United States, residing near Lexington, in the county of Morrow and State of Oregon, have invented a new and useful Land Roller and Packer, of which the following is a specification.

This invention relates to improvements in land rollers and packers of that type employing packing wheels mounted to rotate independently around a stationary shaft, the wheels being designed for rolling and packing summer fallowed ground or grain fields to so condition the soil that moisture may be retained for coming crops.

One of the objects of the invention is to provide an implement of this character in which the packing wheels are of peculiar construction and adapted to so pack the soil that it cannot be easily washed or drained by excessive precipitation of rain, and each of which is designed to embed itself well into the loose soil and pack the fallowed ground beneath the surface, leaving the surface in such shape as to retain the snow and rain water so that a sufficient amount will be stored up for future crops.

Another object of the invention is to provide an implement of the character described in which the parts are combined and arranged in a novel manner to secure strength, durability, ease of operation and general efficiency, as well as to provide means for thoroughly lubricating the bearings of the series of packing wheels.

Still another object is to provide a construction by which the implement, when made of any length, may consist of two or more sections coupled so as to permit independent play thereof so that the sets of wheels may conform to the varying inaccuracies of ground surface, said sections being further connected by the draft attachments in such a manner as to enable the implement to be easily drawn.

With these and other objects in view, the invention consists of the novel construction, combination and arrangement of parts hereinafter fully described and claimed, reference being had to the accompanying drawings, in which,—

Figure 1 is a rear elevation, showing an implement composed of two sections. Fig. 2 is a top plan view of the forward ends of the tongues, illustrating the manner in which they are coupled. Fig. 3 is a top plan view of the adjacent ends of the sections of the implement on an enlarged scale, showing the pivotal coupling connection between the same and the mode of centrally connecting the draft bar thereto. Fig. 4 is a central front to rear section through one of the sections on the plane indicated by the line 4—4 of Fig. 1. Fig. 5 is a side elevation of one or the inner end hangers or brackets. Fig. 6 is a similar view of one of the packing wheels. Fig. 7 is a cross section through the wheel. Fig. 8 is an enlarged section through the hub of one of the wheels, showing the construction of the lubricating means.

In practice, the implement may be of any convenient length, but in all implements of ten feet or more in length it is preferable to construct the same of two sections, which are pivotally connected to permit them to have sufficient play to conform to the varying inequalities of the ground surface, thus allowing the implement to be more easily drawn and turned and the packing wheels to operate more efficiently on the surface of the ground.

In the drawings I have shown the implement as composed of two longitudinally alined sections 1 and 2, which are duplicates in construction, except as to a minor detail hereinafter noted. Each section or implement proper comprises a frame consisting of a pair of longitudinal, parallel top bars or beams 3 and end and intermediate brackets or hangers 4, 5 and 6, such parts constituting the frame of the machine. The hangers 4, 5 and 6 have the same general angular form, each embodying a metallic casting comprising upper and lower horizontal bars 7 and 8, the bottom bar 8 being relatively shorter than the top bar 7 and connected therewith by oblique arms 9 and angular corner pieces 10, a brace 11 being disposed between the bars and connecting the center of the bar 7 with the center of the bar 8 to add strength to the bracket. The bars 3 are fitted and bolted or otherwise secured at their ends in sockets 12 formed upon the portions 10 of the brackets 4 and 5 and rest intermediately upon seats 13 formed upon the corresponding portions of the intermediate bracket 6, each of said seats having a base 14 inclined at an oblique upward and inward angle and an outer flange 15 to stay the bar from outward movement, said bars being secured to the seats by bolts 16, which also secure substantially V-shaped bracket pieces 17 thereto. Rods 18 fit in grooves in the undersides of the bars 3 and extend the entire length of the same and are suitably connected with the end brackets 4 and 5 to securely tie the parts together. By this construction and arrangement it will be seen the frame bars 3 are set at an inclination at the front and rear corner portions of the frame with their extreme inner and upper corner portions projecting slightly above the plane of the upper arms 7 of the brackets. A tongue 19 is bolted to the bracket pieces 17 of each central hanger, and rests solidly upon the top bar of the hanger, the upper horizontal arms of the bracket pieces 17 and the upper edges of the bases 14 of the seats 13, and is notched or recessed, as indicated at 20, to receive the projecting corner portions of the bars 3, thus enabling it to rest squarely upon the upper surfaces of the central hanger. The forward ends of the tongues of the two sections 1 and 2 are pivotally connected by a rod or bar 21 to maintain them in parallel relation.

The bottom bars 8 of the hangers are provided with openings 22 for the passage of a stationary shaft or axle 23, which shaft is secured against rotation to the brackets by set screws 24. Revolubly mounted on the shaft at equal distances apart is a series of packing wheels 25, each having the outer face of its rim inclined or sloped outwardly and downwardly from the center toward each side at an angle of about 45 degrees, thus forming a substantially V-shaped periphery 26 to cut deeply into the soil. The rim or periphery is provided at regular intervals with concaved depressions or recesses 27, for the dual purpose of facilitating packing of the soil and to prevent excessive moisture from following the wheel tracks and washing the fields, such concavities or recesses being adapted to form at regular intervals along the track followed hills or mounds in the soil to retain snow and rain water in the intervening portions of the furrows, thus storing up moisture in the ground for future crops. The hubs 28 of the wheels are formed with lateral sleeves or extensions 29 over which fit coupling sleeves or tubes 30 extending between the hubs of adjacent wheels and inclosing the intervening portions of the shaft 23, thus excluding dust and dirt from the bearings. Each sleeve carries a cup 31 to contain a suitable lubricant which is automatically fed therefrom to the axle in the operation of the machine, the cup being closed by a screw cap 32.

The sections 1 and 2 are identical in construction with the exception that the inner brackets or hangers 5 thereof are provided with apertured lugs 33 and 34 properly positioned to overlap in pairs to receive an eye bolt 35, whereby the two sections are pivotally coupled. A draw bar 36 is arranged at the front of the machine and is coupled at its ends to the central hangers of the sections and intermediately to the eye bolt 35. Each end coupler or connection comprises a clevis 37 pivoted for vertical movement to the lower front corner of the bracket 6, a clevis 38 pivoted for horizontal or lateral movement to said clevis 37, and a link 39 connecting the clevis 38 with an eye bolt 40 on the draw bar. The central coupler or connection is composed of similar elements 37', 38', 39' and 40', the clevis 37' being pivotally connected with the eye of the coupling bolt 35.

The draft animals are hitched to the tongues and draw bar through suitable draft appliances, not shown, and it will be observed that the manner of applying the tongues and draw bar allows the implement to be conveniently controlled and steered and the sections thereof to have independent play so as to relieve the structure from undue rigidity in running over the surface of the ground.

The device is advantageous for use in the semi-arid sections of the country, as the wheels will act to pack sub-fallowed ground and leave a loose but slightly uneven surface to store up moisture needed for coming crops.

Having thus described the invention, what is claimed as new, is:—

1. An implement of the character described comprising angular end hangers provided at their upper front and rear corner portions with sockets, an intermediate hanger, provided at its upper front and rear corner portions with seats, frame bars engaging said sockets and seats and fastened to the hangers, bracket pieces bolted with the bars to the seats, a tongue resting upon the central hanger and fastened to said brackets, an axle supported by the hangers, and packing wheels carried by the axle.

2. An implement of the character described comprising two pivotally connected sections, each embodying a frame carrying packing wheels, tongues attached to the frames, a rod pivotally connecting the tongues to maintain them in parallel relation, and a draw bar pivotally connected at its ends to the frame and at its center to the pivotal connection between the frames.

3. An implement of the character described comprising a pair of sections, each embodying a frame composed of longitudinal bars and end and intermediate brackets, packing wheels mounted upon the frames, a pivot bolt coupling the inner end brackets of the frame, a draw bar, means pivotally connecting said bar with said bolt and the intermediate brackets of the frames, tongues secured to the centers of the frames and projecting forwardly therefrom, and a rod pivotally connecting the free ends of said tongues to maintain them in parallel relation.

4. An implement of the character described comprising angular end and intermediate hangers, each hanger being formed with top and bottom bars and inclined arms connecting the bars, the said end and intermediate hangers being respectively provided at their upper front and rear corner portions with sockets and obliquely disposed seats, front and rear frame bars engaging said sockets and resting upon the seats, said bars being secured to the hangers and held in an inclined position, angular bracket pieces secured with the bars to the seats, and a tongue resting upon the central hanger and secured to the said bracket pieces.

BURTON H. PECK.

Witnesses:
JAMES S. YEAGER,
SAMUEL E. NOTSON.